United States Patent
Brenneisen et al.

[11] 3,792,972
[45] Feb. 19, 1974

[54] PROCESS FOR THE PREPARATION OF FAST DYEINGS OR PRINTS ON SYNTHETIC FIBROUS MATERIALS

[75] Inventors: Erich Brenneisen, Hofheim/Taunus; Ernst Hoyer, Frankfurt/Main; Maria Kallay, Mammolshain/Taunus; Karl-Heniz Krell, Kronberg/Taunus; Willi Steckelberg, Hofheim/Taunus, all of Germany

[73] Assignee: Farbwerke Hoechst Aktiengesellshaft vormals Meister Lucius & Bruning, Frankfurt, Germany

[22] Filed: Feb. 22, 1973

[21] Appl. No.: 334,778

[30] Foreign Application Priority Data
Feb. 26, 1972 Germany............................ 2209247

[52] U.S. Cl. ...................... 8/41 A, 8/41 R, 8/41 B, 8/41 C, 8/41 D, 8/71, 8/94, 260/193
[51] Int. Cl. ...................... D06p 3/72, C09b 29/32
[58] Field of Search..........8/41 R, 41 A, 41 B, 41 C, 8/41 D, 71, 94; 260/193

[56] References Cited
UNITED STATES PATENTS
2,211,339  8/1940  McNally et al. .................... 260/193

FOREIGN PATENTS OR APPLICATIONS
407,368  8/1966  Switzerland........................ 260/193

Primary Examiner—Donald Levy
Assistant Examiner—Bruce H. Hess
Attorney, Agent, or Firm—Curtis, Morris & Safford

[57] ABSTRACT

A process for the preparation of fast dyeings or prints on synthetic fibrous materials, which comprises treating the said fibrous materials in an aqueous dispersion or in an organic solvent with a dyestuff of the formula (1)

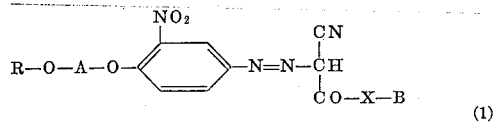

(1)

in which A represents a linear branched alkylene group of 1 to 4 carbon atoms being unsubstituted or substituted by hydroxyl, methoxy, ethoxy, or phenoxy, B represents phenyl being unsubstituted or substituted by fluorine, chlorine, bromine, alkyl of 1 to 4 carbon atoms, alkoxy of 1 to 4 carbon atoms, trifluoromethyl, cyano, carbo(lower)alkoxy, nitro, acetyl, benzoyl or phenyl or by combinations of two members thereof, or naphthyl, X represents -NH- or a direct linkage, and R represents hydrogen, acetyl, propionyl or benzoyl, the yellow dyeings or prints so obtained being distinguished by excellent fastness properties, particularly by a very good fastness to light, a high resistance to sublimation and furthermore, by very good colour yields.

11 Claims, No Drawings

PROCESS FOR THE PREPARATION OF FAST DYEINGS OR PRINTS ON SYNTHETIC FIBROUS MATERIALS

The present invention relates to a process for the preparation of fast dyeings or prints on synthetic fibrous materials.

The present invention provides a process for the preparation of valuable fast dyeings or prints on synthetic fibrous materials by treating these materials with dyestuffs of the general formula 1

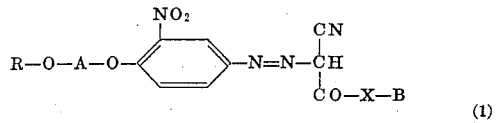

where A represents a linear or branched alkylene group having from 1 to 4 carbon atoms which may be substituted by a hydroxy, methoxy, ethoxy or phenoxy group, B represents a naphthyl radical or a phenyl radical each of which may be substituted by a fluorine, a bromine or a chlorine atom, by alkyl groups and/or by alkoxy groups having from 1 to 4 carbon atoms, by trifluoromethyl, cyano, carboalkoxy, nitro, acetyl, benzoyl and/or phenyl groups, R represents a hydrogen atom or the acetyl, propionyl or benzoyl group and X represents the NH group or a direct linkage, in aqueous dispersion or in organic solvents.

Preferably used are dyestuffs of the general formula 2

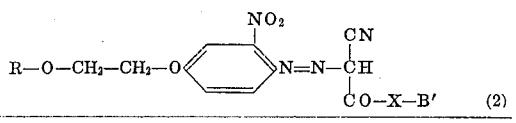

wherein R and X are defined as above and B' represents a naphthyl radical or a phenyl radical which may be substituted by chlorine or bromine atoms and/or by alkyl groups having from 1 to 4 carbon atoms.

From the dyestuffs of the formula 2 indicated above are used with especial advantage those in which R represents a hydrogen atom and which therefore correspond to the general formula (3)

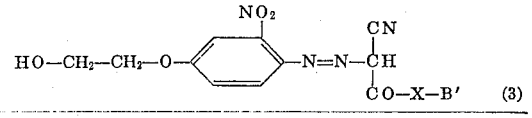

The dyestuffs may also be used in admixture with one another or with other dyestuffs.

The dyestuffs of the formulae 1, 2 and 3 used in accordance with the invention are prepared in generally known manner by diazotizing, for example, a diazo component of the general formula (4)

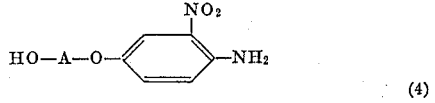

preferably the 3-nitro-4-amino-β-hydroxyphenetol of the formula 5

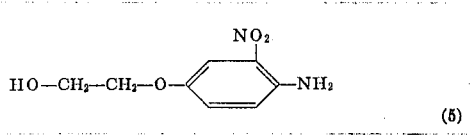

for example in mineral acid solution or suspension with nitrite and coupling it with a coupling component of the general formula 6

preferably of the general formula 7

for example in slightly alkaline, neutral or acid solution or suspension. If in the dyestuffs of the formulae (1) or (2) mentioned above R is intended to be the acetyl, propionyl or benzoyl group, an acylation follows in known manner with a corresponding acid or a suitable acid derivative, for example the acid chloride or the acid anhydride. In the formulae (4), (6) and (7) A, B, B' and X are defined as above.

Suitable synthetic fibrous materials are, for example, those of cellulose esters, polyesters, polyamides, polyurethanes, polyolefins and polyacrylonitriles, among which are preferred for the process of the invention those of cellulose esters, such as cellulose acetate and cellulose triacetate, especially, however, of polyesters, such as polyethylene terephthalate. The synthetic fibrous materials may also be present in mixture with one another or with natural fibrous materials, such as cellulose fibers or wool. Furthermore, they can be present in different processing states, for example, as combed material, flock, threads, fabric or knitted fabric.

The dyestuffs used in accordance with the invention are applied, on principle, in known manner, generally from an aqueous dispersion, but they may also be applied from organic solvents. The dyestuffs may be dispersed, for example, by grinding in the presence of a dispersing agent, for example, the condensation product of formaldehyde and a naphthaline sulfonic acid.

Besides, the dyeing conditions largely depend on the nature of the synthetic fibrous materials and their processing state.

Shaped articles of cellulose acetate, for example, are dyed in a temperature range of about 75° to about 85° C. Cellulose triacetate fibers are dyed at a temperature ranging from about 90° to about 125° C. The dyestuffs are applied on polyamide fibrous materials at a temperature within the range of from about 90° C to about 120° C. Fibrous materials of polyesters are dyed according to the methods therefor known, by dyeing the material in the presence of carriers, such as o-phenylphenol or p-phenylphenol, methylnaphthalene or methylsalicylate at a temperature ranging from about 100° C to about 130° C or by dyeing this material without using carriers at correspondingly elevated temperatures, for example, within the range of from about 120° C to about 140° C. The process of the invention may also be carried out in such a manner that the dyestuffs are applied to the fibrous materials mentioned by padding with or without thickening agent, for example, tragacanth thickening and that they are fixed by the action of heat, for example, steam or dry heat for about ½ to 30 minutes at a temperature ranging from about 100° C to about 230° C. Superficially adhering dyestuff is then advantageously removed from the material so dyed to improve the abrasion resistance, for example, by rinsing or by a reductive after-treatment. This reductive after-treatment is generally carried out at a temperature ranging from about 60° C to about 120° C in an aqueous sodium hydroxide solution, sodium dithionite and a non ionogen detergent, for example, a liquid containing an ethylene oxide-phenol-addition product.

Dyeing of synthetic fibrous materials from organic solvents can be carried out, for example, in such a manner that the dyestuff is absorbed by the fiber from the solution at room temperature or above, preferably at from about 70° to about 130° C, if necessary under pressure, or that in a continuous operation the woven or knitted fabric is impregnated with a dyestuff solution, dried and subjected to a short action of heat, for example, at a temperature ranging from about 180° C to about 210° C. Suitable solvents for the exhaustion method are, for example, those which are not miscible with water and have a boiling point ranging from about 40°C to about 170° C, for example, the aliphatic halogenated hydrocarbons, such as methylene chloride, trichloroethane, trichloroethylene, perchloroethylene or trifluorotrichloroethane. Especially in the case of a continuous dyeing method solvents which are miscible with water may also be used, for example, alcohols or dimethyl formamide. The solvents may, of course, be present as mixtures, and they may contain further auxiliaries soluble in solvents, for example, oxalkylating products of fatty alcohols, alkyl phenols and fatty acids.

To prepare prints on synthetic fibrous materials, for example those of polyesters, polyamides or cellulosetriacetates, the dyestuffs to be used in accordance with the invention can be used in the form of water-containing preparations which may contain in addition to the finely dispersed dyestuff adequate thickening agents and fixation accelerators. Fixation is carried out, for example, after printing and drying by steaming under atmospheric pressure or under elevated pressure up to 2.5 atmospheres gage during 10 to 60 minutes, but it may also be obtained by the action of hot air of about 160° to about 210° C during 30 seconds to 10 minutes.

The dyestuffs of the inventions yield yellow dyeings and prints of excellent fastness properties, especially very good fastnesses to light. They are, also, distinguished by very good colour yields and a high resistance to sublimation. As compared with dyeings and prints which can be obtained with structurally comparable dyestuffs described in U.S. Pat. No. 2,211,339 and Swiss Pat. No. 407,368, the dyeings and prints of the invention are distinguished by considerably superior dyeing properties among which the better absorption power on polyester fibrous materials and better fastness properties, such as fastness to light and to thermofixation are especially to be mentioned.

The following Examples illustrate the invention, the parts and percentages being by weight and the relationship of parts by volume to parts by weight being as the liter to the kilogram under normal conditions.

EXAMPLE 1

10 Parts of polyester yarn were introduced into a dyebath heated to 60° C which consisted of 300 parts of softened water, 0.3 part of finely dispersed dyestuff of the formula

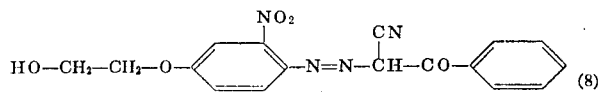

(8)

1 part of a commercial carrier, for example, o-phenylphenol and 0.5 part of ammonium sulfate.

Then, the pH of the dyebath was adjusted to 5 – 5.5 with acetic acid. Within 30 to 60 minutes the temperature was raised to the boiling point and the material was dyed at that temperature during 90 minutes. Then, the fabric was reductively after-treated in a bath which contained in one liter 6 parts of sodium hydroxide solution (38° Be), 4 parts of sodium dithionite and 1 part of a non ionogen detergent. Then, the fabric so dyed was rinsed and dried.

A yellow dyeing was obtained which had very good fastness properties, especially a good fastness to light and to thermofixation and supplied a high colour yield. In an analogous manner fibrous material of cellulose triacetate was dyed in which case the dyebath was advantageously adjusted at pH 6 to 6.5. However, the reductive after-treatment was superfluous. The dyestuff mentioned above could be prepared in the following manner:

39.6 Parts of 3-nitro-4-amino-β-hydroxyethoxybenzene were dissolved while hot in 400 parts of water and 120 parts of 2N hydrochloric acid and, after having been poured onto 2,000 parts of ice water, they were diazotized with 40 parts by volume of a 5 N sodium nitrite solution.

29.6 Parts of the coupling component α-cyanoacetophenon were dissolved in 800 parts of water and 54 parts by volume of a 33 percent aqueous sodium hydroxide solution at room temperature and reprecipitated after the addition of 2 parts of a non-ionogen emulsifier, for example the reaction product of an oleyl alcohol with 30 mols of ethylene oxide by rapidly adding 40 parts by volume of acetic acid in finely dispersed form while stirring. The diazo solution was added and the pH was adjusted at 6.5 with 2 N sodium hydroxide solution.

The dyestuff which precipitated was isolated by filtration and washing. It can be dried or given a finely dispersed form in the form of the water-containing filter residue using commercial dispersing agents, for example, a condensation product of formaldehyde and a naphthalene sulfonic acid.

EXAMPLE 2

10 Parts of a polyester fabric were introduced into a dyebath heated to 50° C which consisted of 400 parts of softened water and 0.2 part of the dyestuff of formula

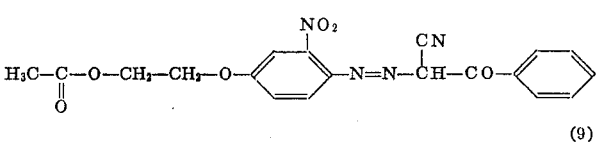

(9)

in a finely dispersed form.

The pH of the dyebath was adjusted at 5 – 5.5 with ammonium sulphate and acetic acid. Within 40 to 60 minutes the temperature was raised to 130° C. The fabric was dyed at that temperature for 1 hour. The material dyed was then after-treated as described in Example 1 and finished.

A yellow dyeing of excellent fastness properties and high tinctorial strength was obtained.

Similar results were obtained when using instead of a fabric of polyester a fabric of cellulose triacetate fibers and effecting the dyeing at a temperaure of 110° C.

Dyeings of equally good fastness properties were obtained when a polyester yarn was dyed for 30 minutes at 120° C in a closed apparatus with the dyestuff of the formula (6) mentioned above from perchloroethylene.

The dyestuff of formula (9) indicated above was obtained when the dry dyestuff of the above formula (8) which could be prepared in the same manner as described in Example 1, was acetylated with acetanhydride, for example, in a solution in benzene while heating.

EXAMPLE 3

A polyester-cellulose blended fabric was impregnated at 25°–30° C with a dyebath which was adjusted to pH 5 – 5.5 with acetic acid and contained 10 g per liter of the finely dispersed dyestuff of the formula

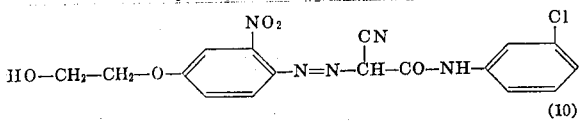

(10)

Then, the material was dried at temperatures ranging between 100° and 110° C. The fixation was effected by means of dry heat at 190° to 230° C during 30 to 90 seconds. Then, reductive after-treatment as described in Example 1 and finishing followed.

A yellow dyeing of excellent fastness properties was obtained, especially of very good resistance to sublimation and fastness to light. Similarly appreciable dyeings were obtained when triacetate fibrous materials were dyed in the manner described above.

The dyestuff of the above formula (10) was obtained as described in Example 1 when the coupling component used was 40.8 parts of 3-chlorocyanacetanilide.

EXAMPLE 4

A polyester fabric was printed and dried with a printing paste which contained per 1,000 parts in addition to a commercial thickening agent, for example, alginate or starch ether and other usual adjuvants 200 parts of an aqueous dyestuff preparation which contained 10 percent of the finely dispersed dyestuff of the formula

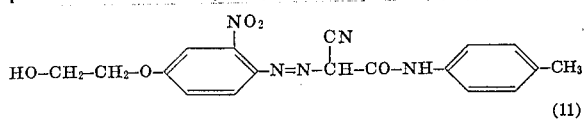

(11)

Then, fixation was effected with dry heat at 200° C for 60 seconds.

The print was rinsed, reductively after-treated in a bath which contained sodium dithionite and sodium hydroxide solution, purified in another bath which contained a non ionogen detergent, for example the condensation product of nonyl phenol and 10 mols of ethylene oxide, rerinsed and dried.

A yellow print was obtained which had a high tinctorial strength and excellent fastness properties, especially an excellent fastness to thermofixation.

Similarly good results were obtained when the fixation was effected during 20 minutes with pressure steam of 2 atmg.

When using instead of a polyester fabric a fabric of cellulose triacetate, without reductive after-treatment, prints were obtained which had the same high tinctorial strength and very good fastness properties.

The dyestuff of the above formula (11) was obtained in the manner described in Example 1 when the coupling component used was 35.5 parts of 4-methylcyanacetanilide.

EXAMPLE 5

A polyester fabric was printed and dried with a printing paste as described in Example 4 which, however, contained the dyestuff of the formula

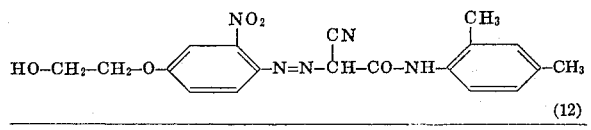

(12)

Fixation was carried out by steaming under atmospheric pressure during 30 minutes. When the aftertreatment and the drying had been completed, a yellow print of high tinctorial strength and good fastness properties was obtained.

When printing instead of a polyester fabric a cellulose acetate fabric in the manner described above, an appreciable print was obtained, too.

The dyestuff of formula (12) indicated above was obtained in the manner described in Example 1 when the coupling component used was 38.4 parts of 2,4-dimethylcyanacetanilide.

The following Table contains a list of further dyestuffs usable in accordance with the invention which correspond to the general formula (1)

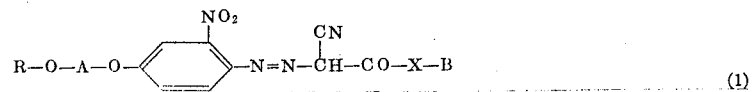

(1)

| Example number | R | A | H | B | Shade on polyester fibers |
|---|---|---|---|---|---|
| 6 | H | —C₂H₄— | —NH— | 2-methyl-phenyl | Yellow. |
| 7 | H | —C₂H₄— | —NH— | 3-methyl-phenyl | Do. |
| 8 | H | —C₂H₄— | —NH— | 4-t-butyl-phenyl | Do. |
| 9 | H | —C₂H₄— | —NH— | 4-i-propyl-phenyl | Do. |
| 10 | H | —C₂H₄— | —NH— | 4-ethyl-phenyl | Do. |
| 11 | H | —C₂H₄— | —NH— | 2-chloro-phenyl | Do. |
| 12 | H | —C₂H₃ | —NH— | 2-bromo-phenyl | Do. |
| 13 | H | —C₂H₄ | | 2-chloro-phenyl | Do. |
| 14 | H | —C₂H₄ | | 2-bromo-phenyl | Do. |
| 15 | H | —C₂H₄ | | 4-chloro-phenyl | Do. |
| 16 | H | —C₂H₄— | | 4-methyl-phenyl | Do. |
| 17 | H | —C₂H₄— | —NH— | 2-methyl-5-chlorophenyl | Do. |
| 18 | H | —C₂H₄— | —NH— | 3-trifluoromethyl-phenyl | Do. |
| 19 | H | —C₂H₄— | —NH— | 2-nitro-phenyl | Do. |
| 20 | H | —C₂H₄ | —NH— | Phenyl | Do. |
| 21 | H | —C₂H₄ | —NH— | Naphthyl | Do. |
| 22 | H | —C₂H₄ | —NH— | 4-fluoro-phenyl | Do. |
| 23 | H | —C₂H₄— | —NH— | 3-cyano-phenyl | Do. |
| 24 | H | —C₂H₄— | —NH— | 4-carboethoxy-phenyl | Do. |

Table I – Continued

| Example number | R | A | H | B | Shade on polyester fibers |
|---|---|---|---|---|---|
| 25 | H | $-C_2H_3-$ | $-NH-$ | 2-methoxy-phenyl | Do. |
| 26 | H | $-C_2H_4-$ | $-NH-$ | 4-n-butoxy-phenyl | Do. |
| 27 | H | $-C_2H_4-$ | $-NH-$ | 2-ethoxyphenyl | Do. |
| 28 | H | $-C_2H_4-$ | $-NH-$ | 2-methoxy-phenyl | Do. |
| 29 | H | $-C_2H_4-$ | $-NH-$ | 4-nitro-2-methoxy phenyl | Do. |
| 30 | H | $-C_2H_4-$ | $-NH-$ | 4-trifluoromethyl-2-nitro-phenyl | Do. |
| 31 | H | $-C_2H_4-$ | $-NH-$ | 3-acetylphenyl | Do. |
| 32 | H | $-C_2H_4-$ | $-NH-$ | 3-benzoyl-phenyl | Do. |
| 33 | H | $-C_2H_4$ | $-NH-$ | 4-biphenyl | Do. |
| 34 | Benzoyl | $-C_2H_4-$ | $-NH-$ | Phenyl | Greenish yellow. |
| 35 | do | $-C_2H_4-$ | | do | Do. |
| 36 | do | $-C_2H_4-$ | $-NH-$ | 2-chloro-phenyl | Do. |
| 37 | Acetyl | $-C_2H_4-$ | $-NH-$ | 4-methylphenyl | Yellow. |
| 38 | do | $-C_2H_4-$ | $-NH-$ | 2,4-dimethyl-phenyl | Do. |
| 39 | do | $-C_2H_4-$ | $-NH-$ | 2-nitro-phenyl | Do. |
| 40 | do | $-C_2H_4-$ | $-NH-$ | 3-cyano-phenyl | Greenish yellow. |
| 41 | Propionyl | $-C_2H_4-$ | | Phenyl | Yellow. |
| 42 | do | $-C_2H_4-$ | $-NH-$ | 2-chloro-phenyl | Do. |
| 43 | do | $-C_2H_4-$ | $-NH-$ | 2-methyl-phenyl | Do. |
| 44 | H | $-CH_2$ | $-NH-$ | 2-methoxy-phenyl | Do. |
| 45 | Acetyl | $-(CH_2)_3$ | | Phenyl | Do. |
| 46 | H | $-CH(CH_3)CH_2-$ | | do | Do. |
| 47 | H | $-CH_2CH(OH)CH_2$ | | do | Do. |
| 48 | H | $-CH-CH_2$<br>$\,\,\,\,\,\,\,\,\,\,\,CH_2-O-C_6H_5$ | | do | Do. |
| 49 | H | $-CH-CH_2$<br>$\,\,\,\,\,\,\,\,\,\,\,CH_2-OCH_3$ | | do | Do. |
| 50 | Acetyl | $-CH(CH_3)CH_2-$ | $-NH-$ | 4-methyl-phenyl | Do. |

We claim:

1. A process for the preparation of fast dyeings or prints on synthetic fibrous materials, which comprises treating the said fibrous materials in an a dye bath selected from the group consisting of an aqueous dispersion, an organic solvent and mixtures thereof with a dyestuff of the formula (1)

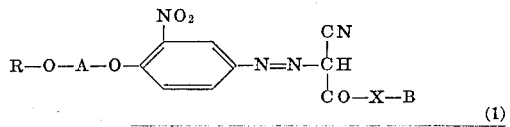

in which A represents a linear branched alkylene group of 1 to 4 carbon atoms being unsubstituted or substituted by hydroxyl, methoxy, ethoxy or phenoxy, B represents phenyl being unsubstituted or substituted by fluorine, chlorine, bromine, alkyl of 1 to 4 carbon atoms, alkoxy of 1 to 4 carbon atoms, trifluoromethyl, cyano, carbo(lower)alkoxy, nitro, acetyl, benzoyl or phenyl or by combinations of two members thereof, or naphthyl, X represents -NH- or a direct linkage, and R represents hydrogen, acetyl, propionyl or benzoyl.

2. A process as claimed in claim 1, wherein the synthetic fibrous material is selected from the group consisting of cellulose acetate, cellulose triacetate, polyamides, polymethanes, polyolefins, polyacrylonitriles and polyesters.

3. A process as claimed in claim 1, wherein the said fibrous materials are dyed with an aqueous dispersion of the said dyestuffs at a temperature between 75° and 140° C in the absence or in the presence of a carrier.

4. A process as claimed in claim 1, wherein the said fibrous materials are dyed with the said dyestuffs from organic solvents between room temperature and about 130° C.

5. A process as claimed in claim 1, wherein the said fibrous materials are padded with an aqueous dispersion of the said dyestuffs and the dyestuffs are subsequently fixed at elevated temperature.

6. A process as claimed in claim 5, wherein the aqueous dispersion of the dyestuffs contains a thickening agent.

7. A process as claimed in claim 5, wherein the dyestuffs are fixed by steaming or treating them with dry heat at a temperature between about 100° and about 230° C.

8. A process as claimed in claim 1, wherein the fibrous materials are impregnated with the said dyestuffs from an organic solvent and dried, and the dyestuffs are subsequently fixed by a short-time action of heat.

9. A process as claimed in claim 1, wherein the dyestuffs are fixed by a short-time action of heat at a temperature of from about 180° C to about 210° C.

10. A process as claimed in claim 1, wherein the said fibrous materials are printed with water-containing preparations of the said dyestuffs and the dyestuffs are subsequently fixed by drying the prints and steaming them under atmospheric pressure or elevated pressure of up to 2.5 atmg or by a short-time action of hot air of about 160° to about 210° C.

11. A process as claimed in claim 10, wherein the water-containing preparations of the dyestuffs contain a member selected from the group consisting of a thickening agent, a fixing accelerator and a combination thereof.

* * * * *